United States Patent
Douma et al.

(10) Patent No.: US 6,852,966 B1
(45) Date of Patent: Feb. 8, 2005

(54) METHOD AND APPARATUS FOR COMPENSATING A PHOTO-DETECTOR

(75) Inventors: Darin James Douma, Monrovia, CA (US); James Walter Stewart, San Jose, CA (US); Rudy Hofmeister, Sunnyvale, CA (US); Anthony W. Ho, Sunnyvale, CA (US); Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/285,264

(22) Filed: Oct. 30, 2002

Related U.S. Application Data
(60) Provisional application No. 60/414,291, filed on Sep. 27, 2002, and provisional application No. 60/416,162, filed on Oct. 4, 2002.

(51) Int. Cl.[7] .................................................. H01J 40/14
(52) U.S. Cl. ............................ 250/214 AG; 250/214 C; 327/514
(58) Field of Search .................. 250/214 AG, 214 C, 250/214 R; 327/514; 361/93.1, 93.8

(56) References Cited

U.S. PATENT DOCUMENTS

| | | | |
|---|---|---|---|
| 4,359,553 A | 11/1982 | Edwards | |
| 4,378,451 A | 3/1983 | Edwards | |
| 5,041,491 A | 8/1991 | Turke et al. | |
| 5,516,563 A | 5/1996 | Schumann et al. | |
| 5,953,690 A | 9/1999 | Lemon et al. | |
| 6,157,022 A | 12/2000 | Meada et al. | |
| 6,188,059 B1 | 2/2001 | Nishlyama et al. | |
| 6,313,459 B1 | * | 11/2001 | Hoffe et al. ............ 250/214 R |
| 6,643,472 B1 | * | 11/2003 | Sakamoto et al. .......... 398/202 |

FOREIGN PATENT DOCUMENTS

| | | |
|---|---|---|
| EP | 0745868 A1 | 12/1996 |
| EP | 0745868 B1 | 4/2002 |
| WO | WO98/00943 | 1/1998 |

* cited by examiner

Primary Examiner—Stephone B. Allen
Assistant Examiner—Patrick J. Lee
(74) Attorney, Agent, or Firm—Workman Nydegger

(57) ABSTRACT

The method and apparatus for compensating a photo-detector allows both regulation and monitoring of the photo-detector to be performed with a common digital controller. The controller accepts input of monitored operational parameters including received signal strength and temperature. The controller provides as an output a bias control signal which regulates a positive the positive or negative side bias voltage power supply for the photo-detector. The controller maintains the bias voltage to the photo-detector at levels which optimize the gain and signal-to-noise ratios for the photo-detector thereby facilitating the decoding of the received signal over a broad range of signal strengths and temperatures. The controller includes a corresponding digital signal strength and temperature compensators the outputs of which summed with a summer to provide the bias control signal. The digital signal strength compensator also provides as an output a monitor signal a level of which corresponds to the actual signal strength received by the photo-detector after compensation for the variable gain of the photo-detector resulting from the bias voltage level. A transceiver as well as methods and means for monitoring a photo-detector are also disclosed.

27 Claims, 9 Drawing Sheets

High Side Rx & Compensating Circuits

METHOD AND APPARATUS FOR COMPENSATING A PHOTO-DETECTOR

CROSS REFERENCE TO RELATED APPLICATION

This application claims the benefit of prior filed co-pending Provisional Applications No. 60/414,291 filed on Sep. 27, 2002 entitled "Method and Apparatus for Compensating a Photo-Detector for Varying Operating Parameters" and No. 60/416,162 filed on Oct. 4, 2002 entitled "Method and Apparatus for Compensating a Photo-Detector for Varying Operating Parameters" both of which are incorporated herein by reference in their entirety as if fully set forth herein.

BACKGROUND OF THE INVENTION

1. Field of Invention

The field of the present invention relates in general to optical networks and more particularly to optical receivers.

2. Description of the Related Art

In communication systems light beams are increasingly used for transmitting information. The demand for communication bandwidth has resulted in a conversion of long and short haul communication trunk lines from copper to fiber optic (digital) communication. The wide spectral characteristics of fiber optics support broadband signals at very high data rates, gigabits per second.

Generally, an optical source, i.e. transmitter, converts an electrical signal, either digital or analog, to a modulated light beam which is then passed through an optical fiber to an optical detector, i.e. receiver, that extracts an electrical signal from the received light beam. A fiber may be shared with different communication channels using frequency, time or other forms of multiplexing. A typical optical link extends the range of a communication system with a transceiver unit that handles opto-electronic conversion between an optical fiber(s) and local area networks (LAN) on opposing ends of the fiber. Optical transceivers offer gigabit communication rates over long haul trans-oceanic cables or short range links in a metropolitan area.

A typical transmitter operates at a fixed power level. An optical link may range in distance from several meters to a hundred kilometers thereby delivering a broad range of optical signal levels at the optical receiver. The optical receiver must function with both precision and accuracy over the broad range of received optical signal levels. Typically an optical receiver includes either a positive-intrinsic-negative (PIN) type or an avalanche photo-diode (APD) type photo-detector. The two types have different gain and signal-to-noise characteristics both of which vary with operational parameters such as the bias voltage and temperature. Both types of photodetectors require monitoring of parameters such as received optical power and temperature to assure the received signal is in appropriate range to ensure proper decoding of data at receiver. Typically regulation of gain and signal-to-noise characteristics is approached with analog circuitry and monitoring with digital circuitry.

What is needed are new means for regulation and monitoring of photo-detectors which avoid the complexity and expense of prior art approaches.

SUMMARY OF THE INVENTION

A method and apparatus is disclosed for compensating a photo-detector which may be part of an optical receiver or transducer. The compensating allows both regulation and monitoring of the photo-detector to be performed with a common digital controller. The controller accepts input of monitored operational parameters including received signal strength and temperature. The controller provides as an output a bias control signal which regulates a positive or negative side bias voltage power supply for the photo-detector. The controller maintains the bias voltage to the photo-detector at levels which optimize the gain and signal-to-noise ratios for the photo-detector thereby facilitating the decoding of the received signal over a broad range of signal strengths and temperatures. The controller includes a corresponding digital signal strength compensator which outputs a target bias voltage and a temperature compensator which outputs a temperature related voltage offset which compensates the bias voltage for variations in the photo-detector temperature. A summer sums the outputs of the signal strength and temperature compensators to provide the bias control signal which drives the bias voltage power supply. The digital signal strength compensator also provides as an output a monitor signal a level of which corresponds to the actual optical signal strength received by the photo-detector after compensation for the variable gain of the photo-detector resulting from the bias voltage level.

In alternate embodiments of the invention a transceiver as well as a method and means for monitoring a photo-detector are also disclosed and claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1:
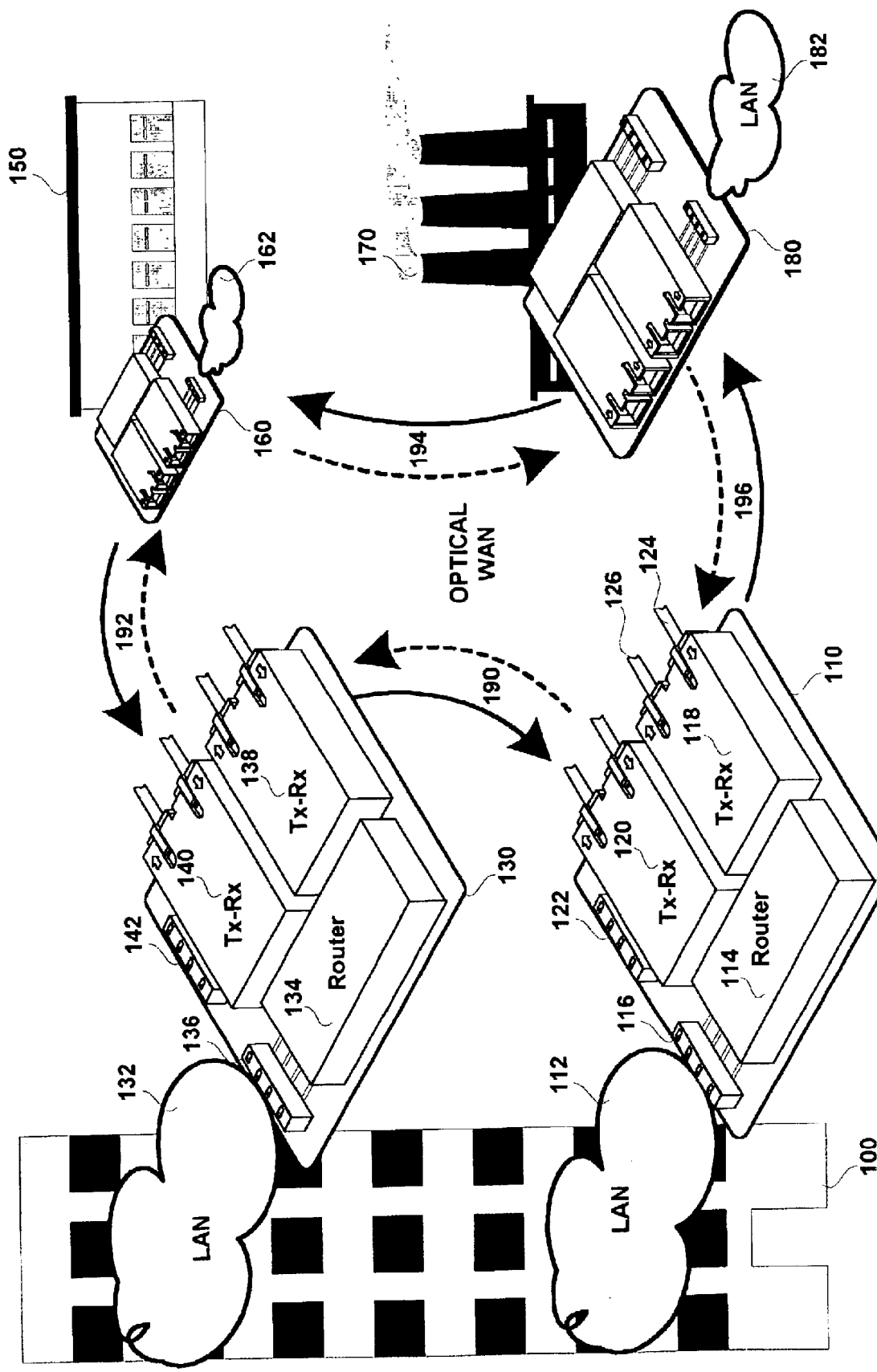
FIG. 1 shows a plurality of optical transceivers coupled to one another to form a wide area network (WAN).

FIG. 1 shows a plurality of optical transceivers coupled to one another to form a wide area optical network (WAN) which handles communications between a plurality of local area networks (LANS). LANS 112, 132 are shown in a corporate headquarters 100. LAN 162 is shown in the corporate warehouse 150. LAN 182 is shown in the corporate factory 170. All LANS are linked by a high speed optical backbone network. Optical segments of the optical network may vary in length from a few meters to hundreds of kilometers. At each corporate location the corresponding LAN provides electrical communication links to networked workstations, servers, process machinery, etc. To handle the high bandwidth communication between LANs optical transceiver cards 110, 130, 160 and 180 are shown coupled to LANS 112, 132,162 and 182 respectively. These optical transceiver cards are optically linked together and form the nodes of the optical backbone network which handles high speed communications between the LANs.

In the embodiment shown each optical transceiver card comprises a pair of dual port transceivers and a router. Each transceiver card forms a node of the optical network. The optical network links the LANs. The transceivers cards are coupled in a dual ring topology with ring segments 190,192, 194, 196. Each transceiver is shown receiving and transmitting optically modulated information from either of the dual rings. Each transceiver has a receive port and a transmit port coupled to the corresponding segments of each ring. Information can be thought of as passing clockwise in one ring and counterclockwise in the other of the dual rings. All transceivers perform an optical-to-electrical conversion on received data which is then analyzed by an integral router to determine its destination. If the information is determined by one of the routers to be destined for a LAN to which the transceiver card is coupled then the router offloads the information from the optical network to the corresponding LAN.

Optical card 110 includes two transceivers 118, 120 and a router 114. The router 114 couples through a LAN interface 116 with LAN 112. The transceivers couple via corresponding pairs of transmit and receive ports to the corresponding network segments which form the dual optical ring topology. Fiber optic cables 126 and 124 handle the transmission and reception respectively of information between line cards 110 and 180 via ring segments 196. Another pair of fiber optic cables (not shown) handle the transmission and reception of information between line cards 110 and 130 via ring segments 190. Monitoring of the transceivers 118–120 occurs via the monitor interface 122.

Optical card 130 includes two transceivers 138, 140 and a router 134. The router 134 couples through a LAN interface 136 with LAN 132. The transceivers couple via corresponding pairs of transmit and receive ports to the corresponding network segments which form the dual optical ring topology. Fiber optic cables (not shown) handle the transmission and reception of information between line cards 130 and 160 via ring segments 192. Monitoring of the transceivers 138–140 occurs via the monitor interface 142. Line cards 160 and 180 are coupled to one another with ring segments 194.

The monitoring and regulation of the receiver portion of each transceiver is performed with a common digital controller. The controller maintains the bias voltage to the photo-detector portion of the receiver at levels which optimize the gain and signal-to-noise ratios for the photo-detector thereby facilitating the decoding of the received signal over a broad range of signal strengths and temperatures. The digital signal strength compensator also provides as an output a monitor signal a level of which corresponds to the actual received signal strength at the receiver. Receiver monitoring is employed for diagnostic or preventive maintenance purposes such as determining when to replace a component based on monitored parameters. Component aging or life cycle stage can be determined based on monitored parameters, with the result that components are replaced before failure.

Figure 2A:
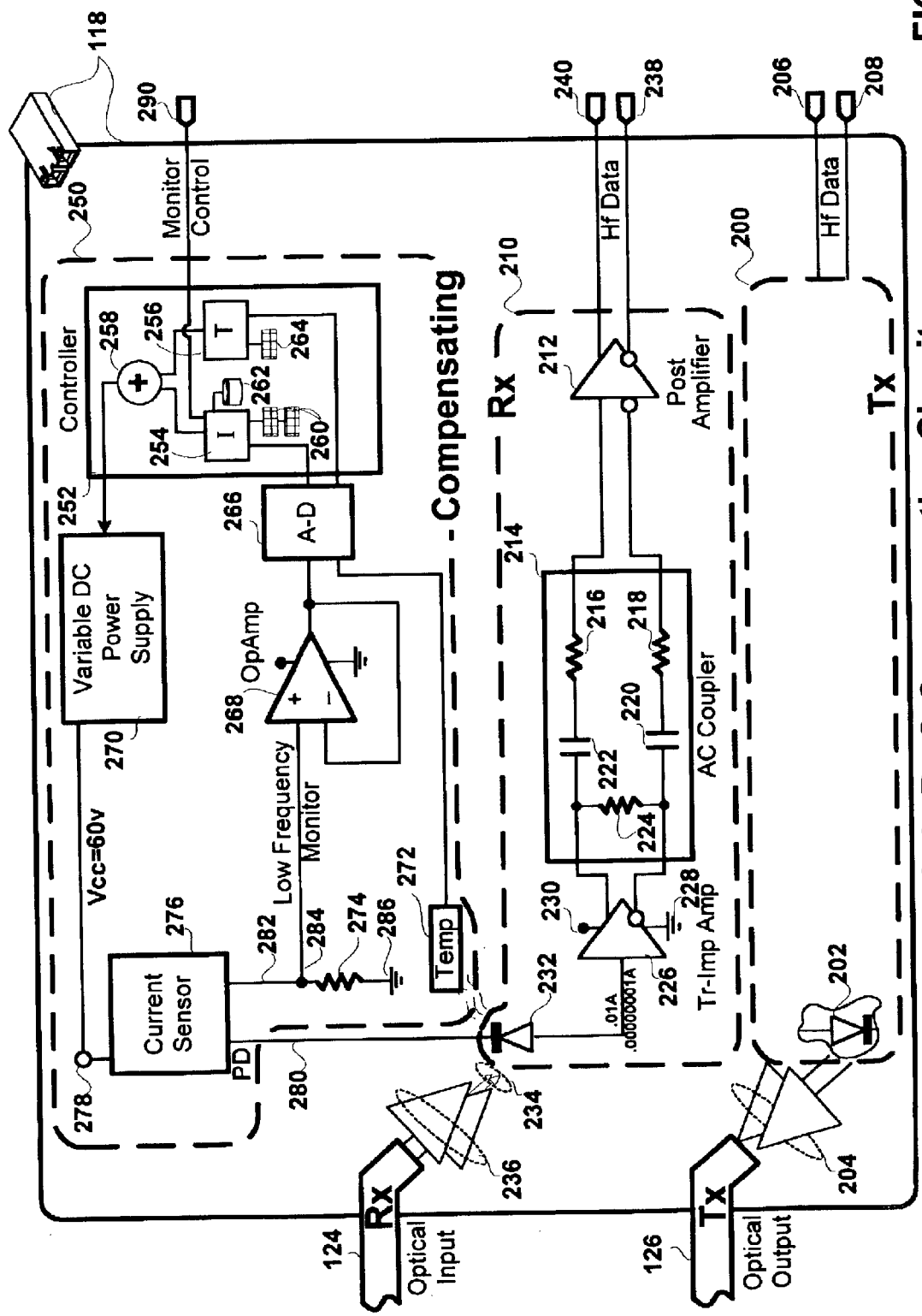
FIG. 2A is a circuit diagram of an embodiment of the invention with an optical transceiver having a bias voltage compensating circuit coupled on the high side of the optical detector.

FIG. 2A is a circuit diagram of an embodiment of the invention with an optical transceiver 118 (See FIG. 1) with a transmitter 200, a receiver 220 and a compensating circuit 250. The transmitter 200 includes one or more differential signal inputs 206–208 for high speed digital data input from the associated LAN and a photo-diode 202 which transmits an optical beam 204 modulated with the high frequency data into the corresponding fiber optic 126 which forms a segment of the optical network.

The receiver includes a photo-detector 232 optically coupled to the optical network via fiber optic 124 to receive an optically modulated information bearing signal there from. In an embodiment of the invention the photo-detector comprises a positive-intrinsic-negative (PIN) or an avalanche photo-diode (APD). A PIN operates at a 5 volt bias voltage level while an APD may operate at 40–60 volts. The signal strength of the received optical beam may vary over 4–6 orders of magnitude as represented by beams 234 and 236. In the embodiment of the invention shown in FIG. 2A the cathode of the photo-detector is coupled to the input of a trans-impedance amplifier 226 which operates as a current sink for the photo-detector. The TIA has a wide dynamic range and exceptional linearity of performance. A typical telecommunications application requires the TIA to maintain a linear trans-impedance characteristic for input currents ranging from less than 0.01 uA up to 2.5 mA. The high frequency modulated and amplified electrical data is output from the TIA on differential signal lines which are impedance matched and AC coupled with the rest of the receiver circuitry via AC coupler 214. In the embodiment shown, the AC coupler includes high frequency coupling capacitors 220–222 which form, together with series and parallel coupled resistors 224, 216, 218 an impedance matching network. The differential output of the AC coupler is subject to any post amplification in amplifier 212 and the opto-electrically converted signal is output by the receiver on one or more signal lines 238–240 to the rest of the receive path circuitry, e.g. the router 114 for example (See FIG. 1).

A compensating circuit 250 couples on the high side of the receiver to both regulate and monitor the receiver portion of the transceiver. The compensating circuit maintains the bias voltage to the photodetector 232 at levels which optimize the gain and signal-to-noise ratios for the photo-detector thereby facilitating the decoding of the received signal over a broad range of signal strengths and temperatures. The compensating circuit also provides as an output a monitor signal 290 a level of which corresponds to the actual received signal strength at the receiver. The compensating circuit includes a current sensor 276.

The current sensor may range in complexity from a series coupled resistor to a current mirror. The current sensor provides as an output a low frequency signal proportional to the received signal strength. In a resistor embodiment this low frequency signal corresponds with the voltage drop across the resistor. In the current mirror embodiment the current mirror has two legs, a.k.a. a photo-detector leg and a mirror leg, through which pass the photo-detector current "Ip" and a mirror current "Im" respectively. The mirror current provides the low frequency signal proportional to the received signal strength. Both legs of the current mirror couple on the positive side to a voltage source node 278 which in the example shown is a variable DC power supply 270. The control leg of the current mirror couples via line 280 with the anode of the photo-detector 232. In the example shown the supply voltage is controllable between 30–60 volts and the photo-detector is an APD. In alternate embodiments of the invention a PIN type photo-detector may be utilized with a corresponding reduction in the supply voltage level to 3–5 volts for example. The mirror leg 282 of the current mirror supplies the mirror current Im, the level of which corresponds with the received optical signal level as detected by the photo-detector. In the embodiment shown, Im is monitored by conversion to a voltage proportional to current at monitor node 284. This is accomplished by coupling the monitor node resistively to an electrical sink 286. Resistor 274, which couples the monitor node to ground, is used to perform this function. The monitor node 284 is coupled to the input of an operational amplifier 268. Op-amp 268 provides an amplified output proportional to the mirror current to an analog-to-digital (A/D) converter 266. Digitized values corresponding with the mirror current are provided by the A/D to a digital controller 252. The digital controller also accepts as input digital values which correspond with the temperature of the photo-detector 232. A temperature sensor 272 senses the photo-detector temperature and provides a corresponding signal to the A/D converter which in turn provides corresponding digitized values to the controller 252.

The controller may be implemented with a processor, a micro-controller, a programmable logic array (PLA), a field programmable logic array (FPGA) an application specific integrated circuit (ASIC) or any logic capable of implementing a state machine. In an embodiment of the invention the controller includes a current compensator 254 and a temperature compensator 256.

The current compensator accepts as an input the digitized values corresponding to the monitored photo-detector current. The current compensator includes tables and/or formulas 260 for correlating bias voltage target levels $V_i n$ with monitored current levels $I_{in}$, including the maximum and minimum monitored current levels at which a bias voltage transition between upper and lower target levels will take place. The tables/formulas also correlate target bias voltages with gain scalers for scaling photo-detector current levels sensed by the sensors to correspond with the received optical signal strength at the photo-detector. The current compensator also includes a memory 262 for storing the historical bias voltage target levels. The current compensator converts each new digital input corresponding with monitored current levels to an actual current level. This conversion is accomplished by determining the target bias voltage in the history register, a.k.a. memory 262, and the gain scaler for that target bias voltage from the tables/formulas 260. The actual received optical signal strength at the photo-detector is determined by dividing the gain scaler into the sensed current level. The current compensator outputs a signal corresponding to the actual received optical signal strength on line 290.

The current compensator 254 also handles compensation of the bias voltage target for differing received current levels. The current compensator determines whether a toggling of the bias voltage target is appropriate based on the bias voltage target history in memory 262 and the sensed mirror current level at node 284. The current compensator employs digital hysteresis in determining bias voltage target levels so as to avoid unnecessary toggling of the bias voltage at mirror current levels near the transition point between the upper and lower bias target voltages. The hysteresis is implemented using the memory 262 to store prior target bias voltage levels and the tables/formulas 260 which indicate the maximum and minimum values for mirror current levels at which a transition between upper and lower bias voltage target levels is to take place. Once a target bias voltage level is determined by the current compensator, the corresponding value is provided by the current compensator as an input to the summer 258. The other input of the summer is provided by the temperature compensator 256.

The temperature compensator 256 accepts as an input the digitized values corresponding to the monitored photo-detector temperature. The temperature compensator includes tables or formulas 264 which correlate bias voltage offset with monitored temperature $T_{pd}$. As each new determination of photo-detector is made, the corresponding bias voltage offset is determined using the parameters from table/formulas 264. The temperature related offset to the bias voltage is determined by multiplying a compensation coefficient k (volts/Centigrade) times the difference between the current temperature and the reference temperature at which the receiver was calibrated. The resultant value is output by the temperature compensator to the remaining input of the summer 258. The summer sums the bias voltage from the current compensator with the bias voltage offset from the temperature compensator. The resultant sum corresponds with the required bias voltage level. A signal from the summer corresponding with the required bias voltage level is provided as input to the variable DC power supply 270. The output of the variable DC power supply provides the corresponding bias voltage to the photo-detector 232.

Figure 2B:
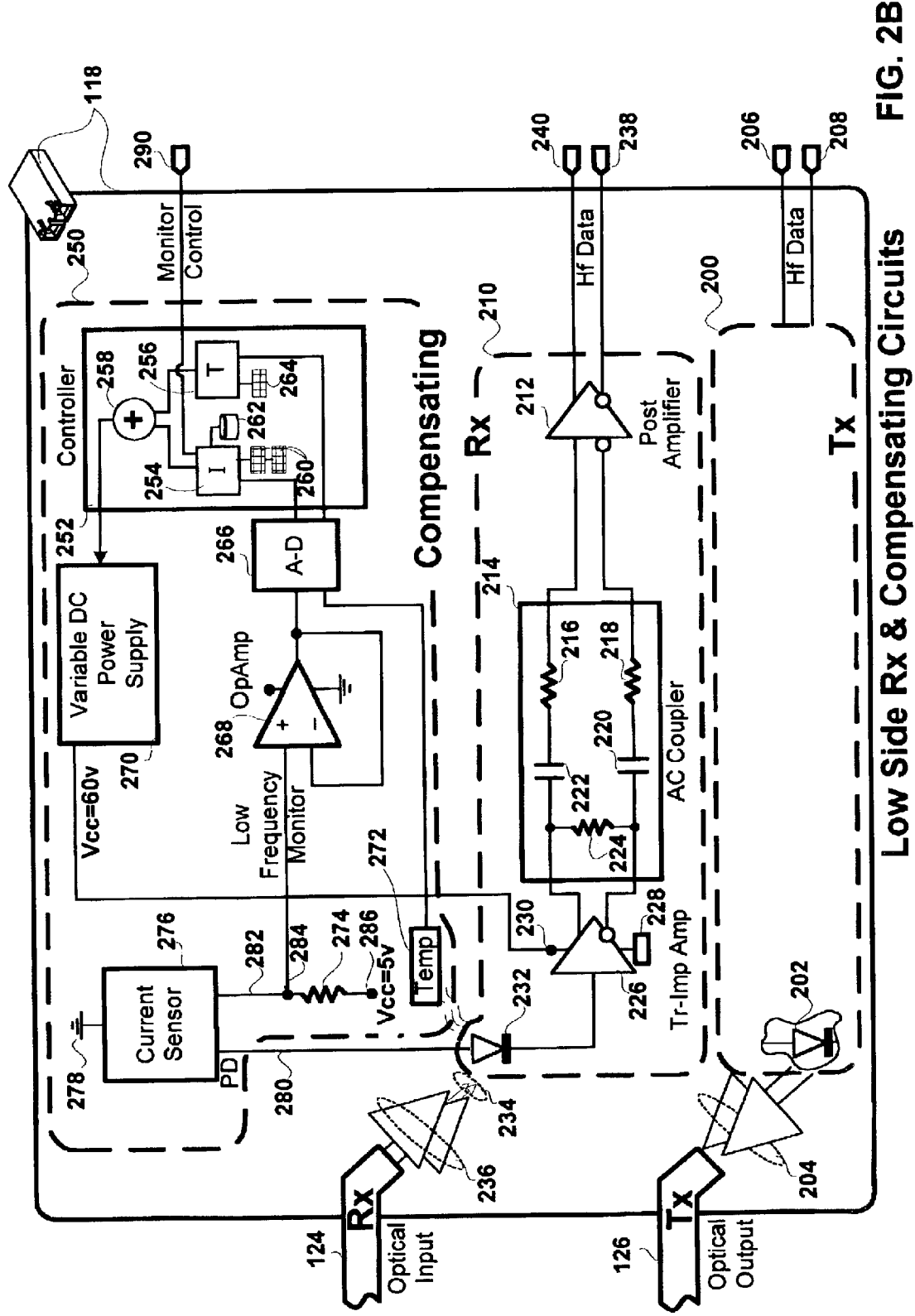
FIG. 2B is a circuit diagram of an embodiment of the invention with an optical transceiver having a bias voltage compensating circuit coupled on the low side of the optical detector.

FIG. 2B is a circuit diagram of an embodiment of the invention with an optical transceiver having the compensating circuit 250 coupled on the low side of the optical receiver 210 to monitor the received signal strength. The receiver includes the photo-detector 232 optically coupled to the optical network via fiber optic 124 to receive the optically modulated information bearing signal there from. In an embodiment of the invention the photo-detector comprises a positive-intrinsic-negative (PIN) or an avalanche photo-diode (APD). The signal strength of the received optical beam may vary over 4–6 orders of magnitude as represented by beams 234 and 236. In the embodiment of the invention shown in FIG. 2B the anode of the photo-detector is coupled to the input of a trans-impedance amplifier 226 which operates as a current source for the photo-detector. The TIA has a wide dynamic range and exceptional linearity performance over currents ranging from less than 0.01 uA up to 2.5 mA. The TIA has a Vsource input 230 coupled to the variable DC power supply 270 which is part of the compensating circuit. The Vsink input 228 of the TIA is coupled to a voltage sink at a level less than that of the power supply. The TIA supplies current to the anode of the photo-detector to which its input is coupled. The high frequency modulated and amplified electrical data is output from the TIA on differential signal lines to the AC coupler 214. The output of the AC coupler is subject to amplification in post amplifier 212. The output of the post amplifier is coupled to one or more high frequency data outputs 238–240.

The compensating circuit 250 couples on the low side of the receiver to monitor the received signal strength as measured by the photo-detector 232. The compensating circuit includes the current sensor 276. The current sensor may be implemented by various means including a series resistor and a current mirror. In the current mirror implementation the current mirror has two legs, a.k.a. a photo-detector leg and a mirror leg, through which pass the photo-detector current "Ip" and a mirror current "Im" respectively. Both legs of the current mirror couple on the negative side to a voltage sink at node 278 which in the example shown is an analog ground. The control leg of the current mirror couples via line 280 with the cathode of the photo-detector 232. The mirror leg 282 of the current mirror supplies the mirror current Im on line 282. The level of the mirror current corresponds with the received optical signal level as detected by the photo-detector. In the embodiment shown, Im is monitored by conversion to a voltage proportional to current at monitor node 284. This is accomplished by resistor 274 which couples the monitor node to an electrical source, e.g. Vcc=5 Volts. The monitor node 284 is coupled to the input of the operational amplifier 268. The op-amp provides an amplified output proportional to the mirror current to an analog-to-digital (A/D) converter 266 which provides a corresponding digital output to the controller 262. The temperature sensor 272 provides the other input to the controller via the A/D converter. The controller 262 accepts the digital signal inputs corresponding to monitored temperature and mirror current levels and performs the bias voltage regulation and monitoring functions discussed above in the current and temperature compensators. The summed outputs from the current and temperature compensators 254, 256 respectively are used to drive the variable DC power supply 270. The actual current level is output by the current compensator on signal line 290.

Figure 3A:
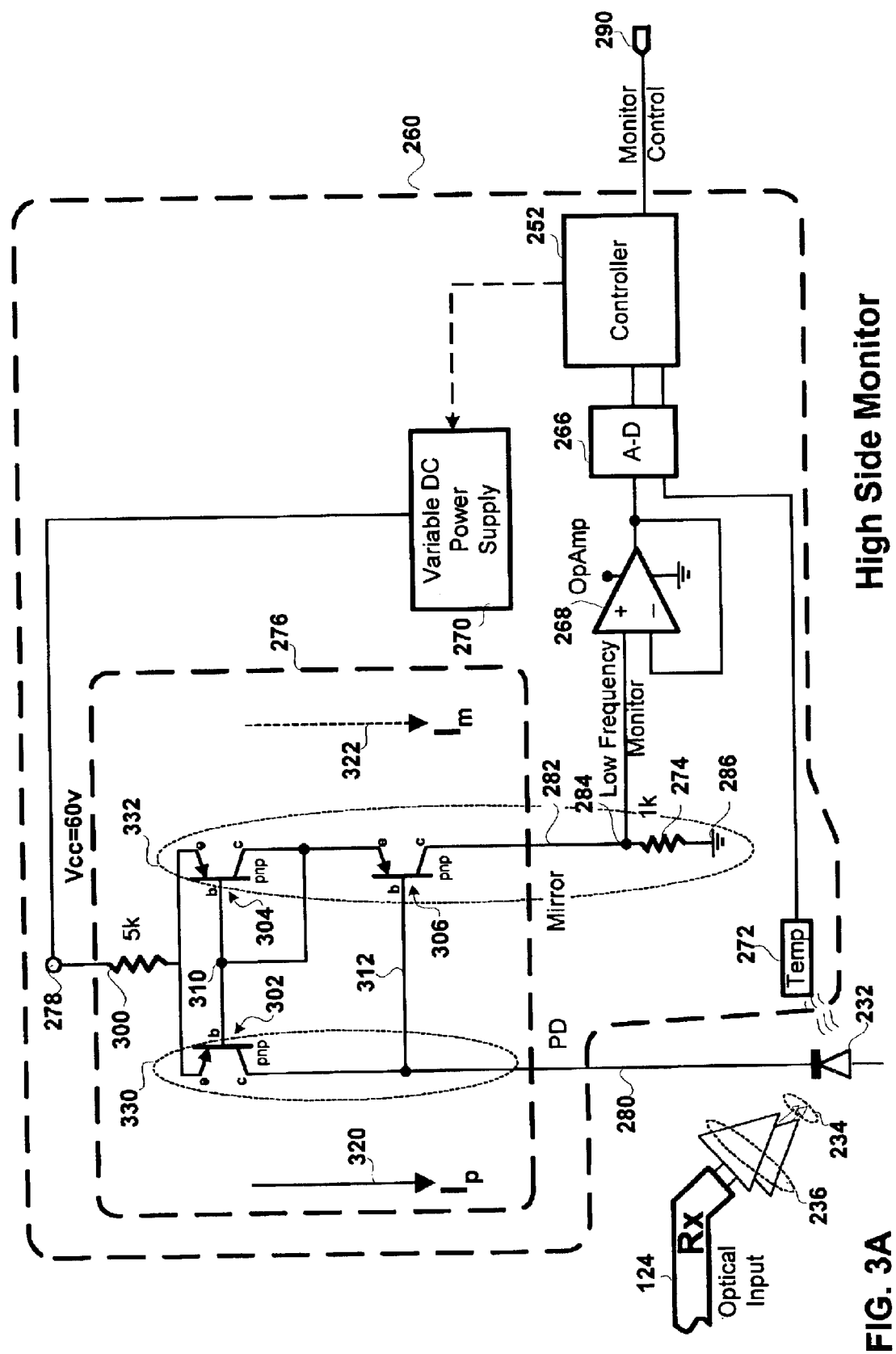
FIGS. 3A-B are detailed circuit diagrams of alternate embodiments of the compensating circuit shown in FIG. 2A.
Figure 3B:
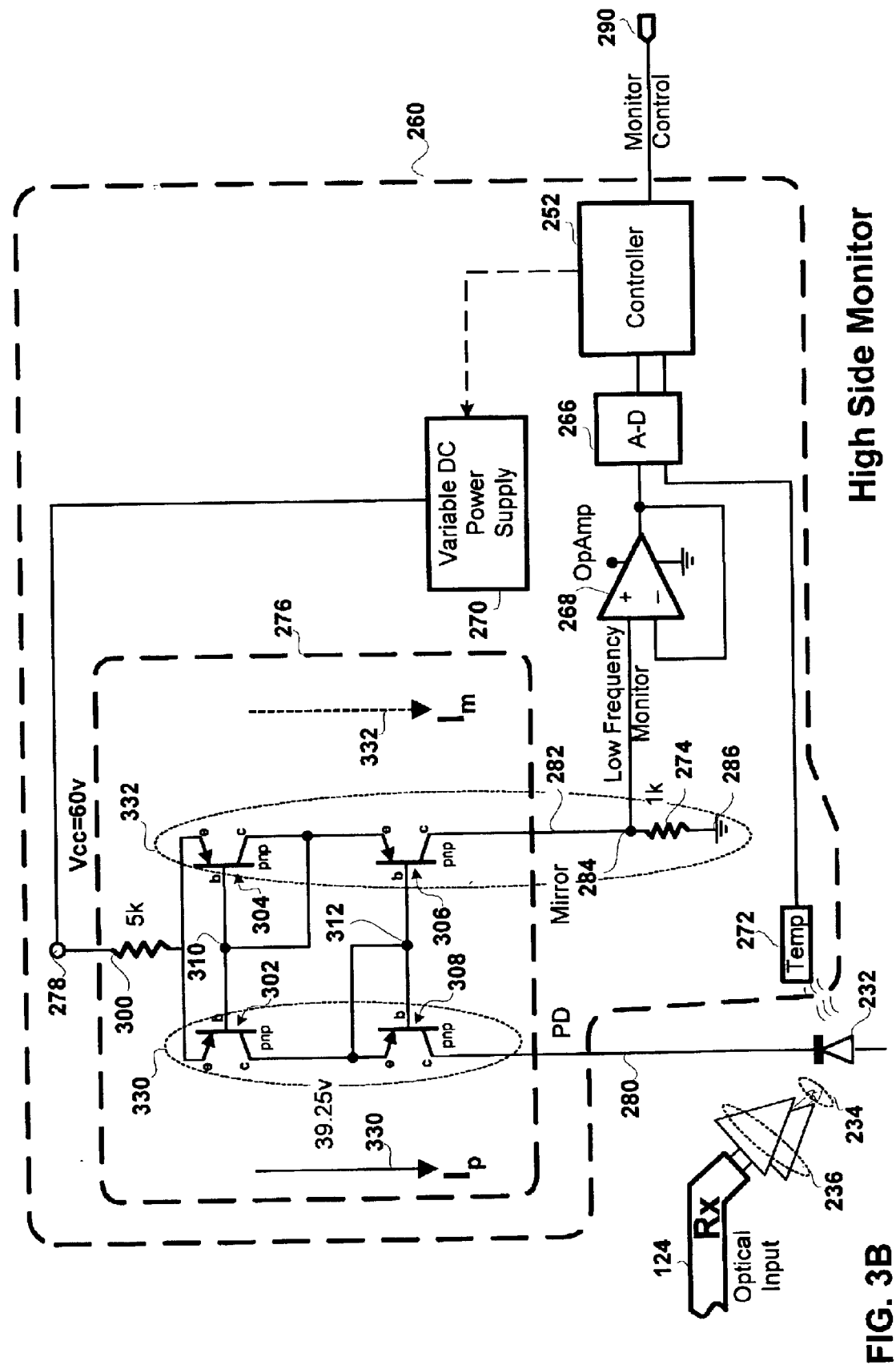

FIGS. 3A-B are detailed circuit diagrams of alternate embodiments of the compensating circuit shown in FIG. 2A and specifically the current mirror 276 portion thereof. The current mirror includes a pair of back-to-back bipolar type transistors 302 and 304 configured as a current mirror. The sense transistor 302 defines the photo-detector (Pd) leg 330 of the current mirror in which flows the photo-detector current Ip reference 320. The mirror transistor 304 defines the monitor leg 332 in which flows the mirror current Im reference 322. The bases of the sense and mirror transistors are coupled to one another and to the collector of the mirror transistor. In the high side embodiment shown in FIGS. 3A–B the sense and mirror transistors comprise 'pnp' type bipolar transistors.

The performance of the current mirror formed by the pair of transistors 302–304 alone is unacceptable, because the mirror current Im generated by the combination of these transistors is limited for practical purposes to an upper range of 5 orders of magnitude. Even within that range the mirror formed by the sense and mirror transistors alone is highly non-linear. Ip and Im differ both in absolute magnitude across the range, e.g. more than 75% difference; as well as in the linearity of the relative magnitudes across the range, e.g. 10% variation.

The Ebers-Moll model of the bipolar transistor provides insight to and quantification of the source of non-linearity and is set forth in the following Equation 1:

Equation 1:

$$I_c = I_o\left(e^{\frac{cV_{be}}{kT}} - 1\right)$$

where Ic is the collector current, Vbe is the base to emitter voltage drop, Io is the reverse leakage current from the emitter to the base, c is the elementary unit of charge, k is the Boltzmann constant, and T is the absolute temperature (in Kelvin). With typical doping levels, the leakage current arising from the "intrinsic" behavior of the pure semiconductor is very small, and the second term –Io is negligible, giving a simple exponential dependence of Ic on Vbe.

An extension to Ebers-Moll that must be considered in current mirrors is that of the Early effect. The Early effect describes the proportionate change in base-to-emitter voltage for bipolar transistors which occurs with changes in collector-to-emitter voltage. The non-linearity between the mirror current and the photo-detector current results from the differences in the collector-to-emitter voltage drops in the two transistors and the concomitant difference in the base-to-emitter voltages of the two transistors due to the Early effect.

Collector-to-emitter voltage differences can be 40 volts in an APD and 4 volts in a PIN implementation. The sense transistor is typically exposed to a voltage drop of 0.7 volts while the mirror transistor is subject to a voltage drop substantially equal to the full supply voltage. The collector currents in the sense and mirror transistors is very sensitive to differences in the base-to-emitter voltages between the two transistors. The disparity in base-to-emitter voltage drops between the sense and mirror transistors results in substantial and non-linear difference between the mirror current and the photo-detector current.

To reduce the difference in the collector-to-emitter voltage drops between each of the pair of transistors 302, 304 a non-linear isolation element is introduced into the mirror leg, with one terminal coupled to the collector of the mirror transistor 304 and an other terminal coupled to the monitor node 284. Suitable non-linear isolation elements include: a Schmidt or Zener diode, a field effect transistor, and a bipolar transistor. Each of these non-linear isolation elements exhibit a non-linear voltage drop between the at least two terminals in response to varying levels of the mirror current. The voltage drop between the at least two terminals is substantially independent of mirror current. This characteristic improves compliance between the mirror current and the photo-detector current by reducing the collector-to-emitter and hence the base-to-emitter voltage differences between the sense and mirror transistors. The disparity in performance due to the Early effect is therefore substantially reduced.

Compliance is defined as the quotient of Ip/Im. In the embodiment shown in FIG. 3A the non-linear isolation element is a bipolar transistor 306 with the emitter terminal coupled to the collector of the mirror transistor and the collector coupled to the monitor node 284. The base is coupled via signal line 312 to the collector of the sense transistor 302. The compliance of this current mirror in an APD implementation is shown in FIG. 5 line 520.

FIG. 3B shows an alternate embodiment of the high side current mirror 276 in which another non-linear isolation element is added photo-detector leg between the sense transistor 302 and the photo-detector 242. Suitable non-linear isolation elements include: a Schmidt or Zener diode and a bipolar transistor. In the embodiment shown in FIG. 3B the non-linear isolation element is a bipolar transistor 308 with the emitter terminal coupled to the collector of the sense transistor and the collector coupled to the photo-detector 242. The base is coupled to the collector of the sense transistor 302. The compliance of this current mirror in an APD implementation is shown in FIG. 5 line 530.

In the embodiments shown in FIGS. 3A–B the emitters of the sense and mirror transistors couple to the voltage source 278 via a resistor 300. This resistor is appropriate for embodiments of the invention in which the photo-detector comprises an APD type. Resistor 300 serves the function of varying the supply voltage inversely with respect to the strength of the received optical signal. Thus the supply voltage to the current mirror is reduced as the optical signal strength increases, thereby improving the performance of the APD. Such resistor would not be necessary in an embodiment of the invention in which a PIN type photo-detector was utilized.

Figure 4A:
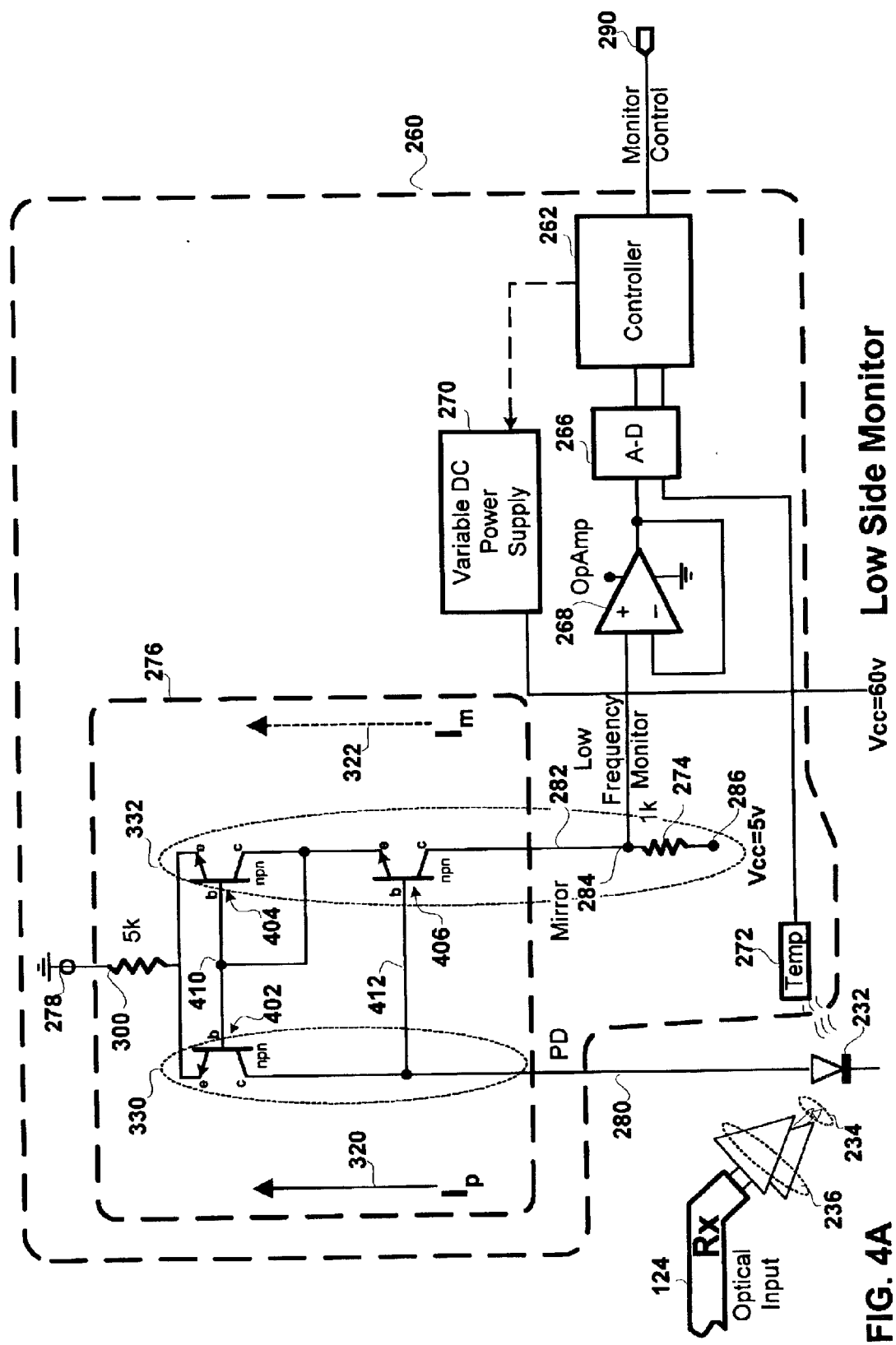
FIGS. 4A-B are detailed circuit diagrams of alternate embodiments of the compensating circuit shown in FIG. 2B.
Figure 4B:
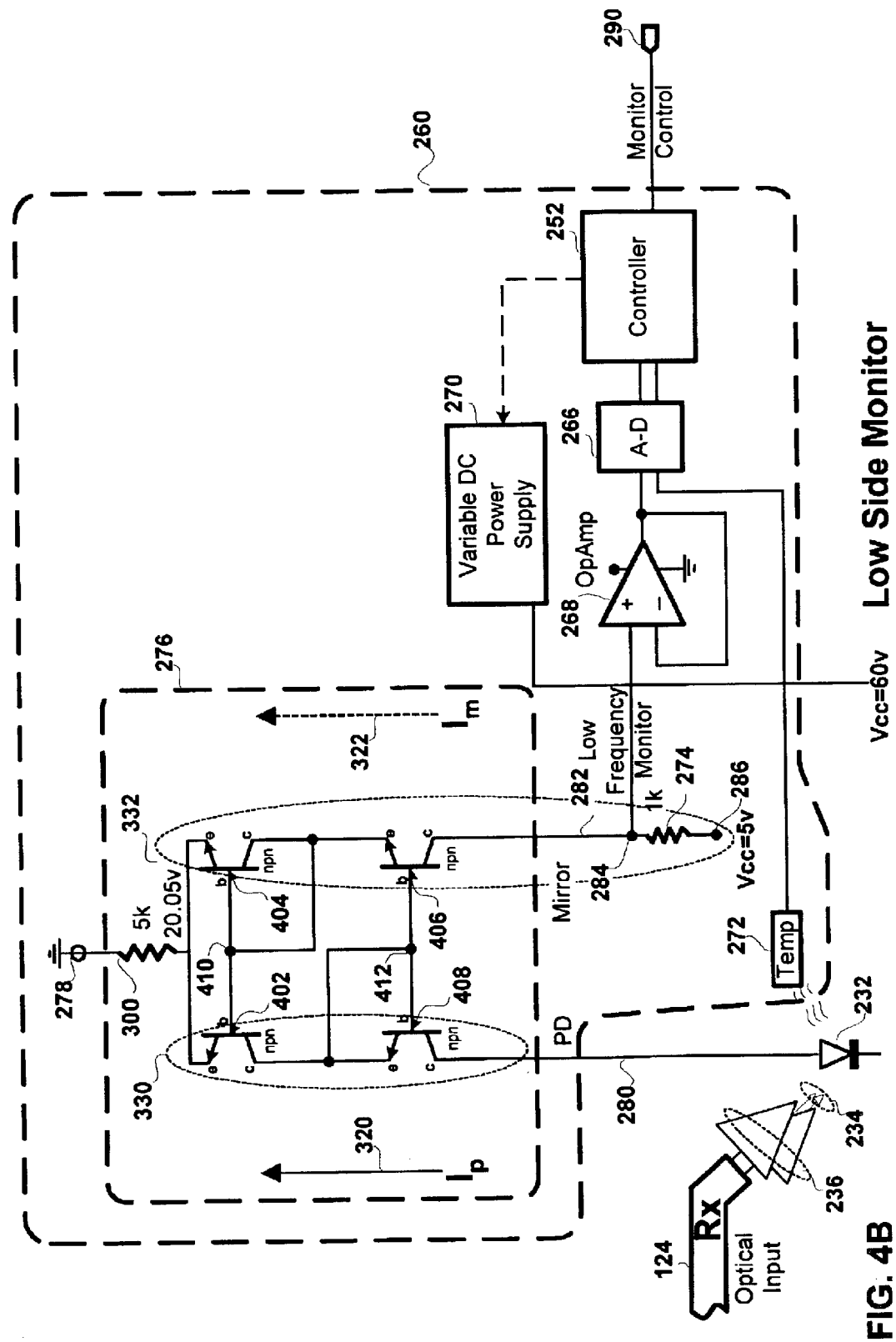

FIGS. 4A–B are detailed circuit diagrams of alternate embodiments of the compensating circuit shown in FIG. 2B with the compensating circuit 260 coupled on the low side of the receiver to monitor the received signal strength as measured by the photo-detector 242. The compensating circuit includes the current mirror 276. The current mirrors shown in FIGS. 4A–D are similar to those shown in FIGS. 3A–B respectively with the exception that the transistors are 'npn' bipolar types with the emitters of the sense and mirror transistors coupled to a voltage sink and with the monitor node 284 coupled through resistor 274 to a voltage source.

Figure 5A:
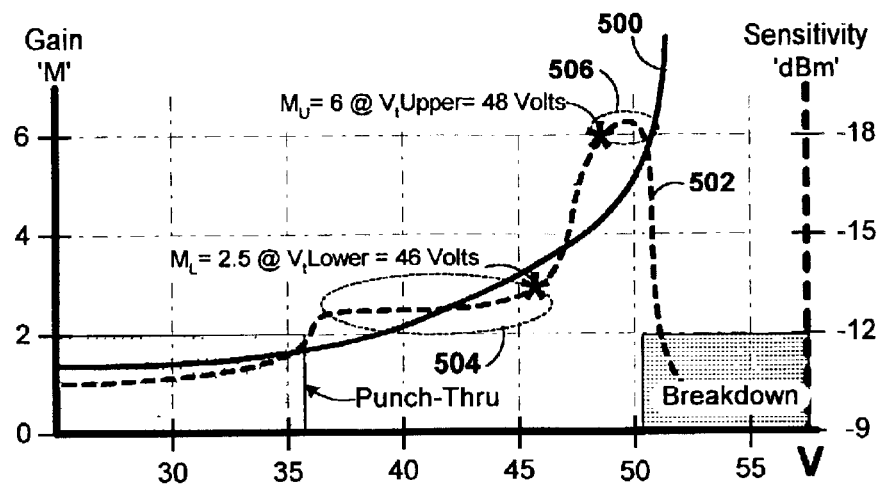
FIG. 5A is a graph showing the photo-detector gain and sensitivity in the optical receiver versus bias voltage.

FIG. 5A is a graph showing the photo-detector gain 500 and sensitivity 502 in the optical receiver versus bias voltage for a representative APD type photo-detector with a high side photo-detector bias circuit. The actual values on the various curves are given as examples only. Similar gain and sensitivity curves with different voltage values would result for a low side photo-detector bias circuit.

The gain curve 500 of the APD rises from a multiple of M=2.5 to a multiple of M=6.0 over a bias voltage range of 30 to 55 volts. The gain scalers correlate the received optical signal level 234–236 at the APD with the photo-detector current level sensed by the current sensor at the level it is delivered to the controller. The gain scaler may be greater or less than 1. The sensitivity curve 502 shows the optical signal levels at which the APD exhibits acceptable signal-to-noise ratios. The sensitivity of the APD exhibits a relatively flat profile over two distinct regions 504–506. In the first of these regions, the low sensitivity region 504, the APD exhibits a photo-electric response of −12 dBm for bias voltages between punch-through at 36 volts up to 46 volts. In the second of these regions, the high sensitivity region 506, the APD exhibits a photo-electric response of −18 dBm for bias voltages between 48 volts and breakdown at 51 volts. In either the upper or lower sensitivity region any increases in gain are offset by decreasing signal to noise ratios. Between the upper and lower sensitivity regions, e.g. between 46–48 volts bias levels, sensitivity rises with photo-detector gain increases overshadowing any decrease in signal to noise ratios of the photo-detector. At high input signal levels the APD bias voltage needs to be lowered to a lower bias voltage level $V_i$Lower (e.g. 46 volts) to reduce the sensitivity of the APD and avoid saturation of the TIA. At low input signal levels the APD bias voltage needs to be raised to an upper bias voltage level $V_i$Upper (e.g. 48 volts) to increase the sensitivity of the APD and raise the signal-to-noise ratio to allow proper decoding of the data at the receiver. The selection of the target bias voltage levels at the upper end of the low sensitivity region, e.g. 46 volts, and the lower end of the high sensitivity region, e.g. 48 volts, allows the operational range of the entire receiver to be extended to five orders of magnitude. The upper and lower target voltage ranges may be calculated empirically or determined by actual measurement of a representative photo-detector.

Figure 5B:
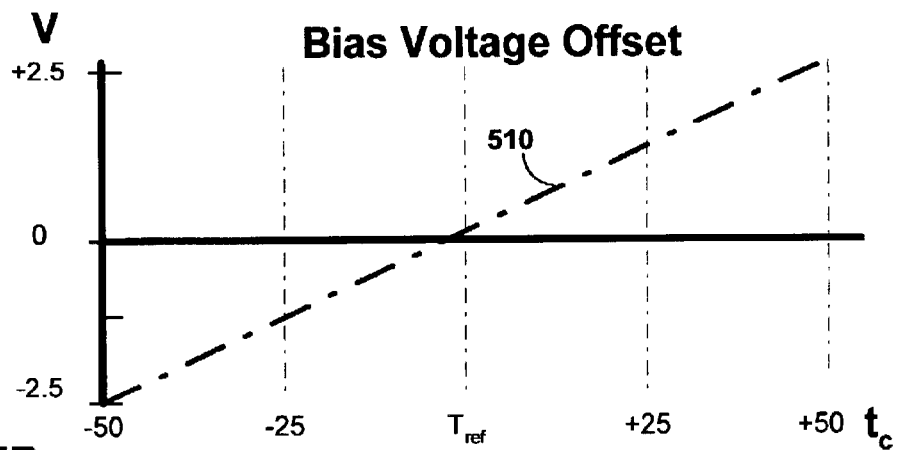
FIG. 5B is a graph showing bias voltage offset versus temperature for a range of photo-detector operating temperatures.

FIG. 5B is a graph with a curve 510 showing bias voltage offset versus temperature for a range of photo-detector operating temperatures. Typically, as a first order approximation, temperature and APD bias levels are inversely linearly related. As the temperature of the APD increases the bias voltage must be increased to maintain the same gain characteristics. A voltage offset of 0.05 volts per degree centigrade is shown. The offset is determined relative to a reference temperature $T_{ref}$ which is the same temperature at which the correlation between actual and monitored current levels are determined for the photo-detector.

Figure 5C:
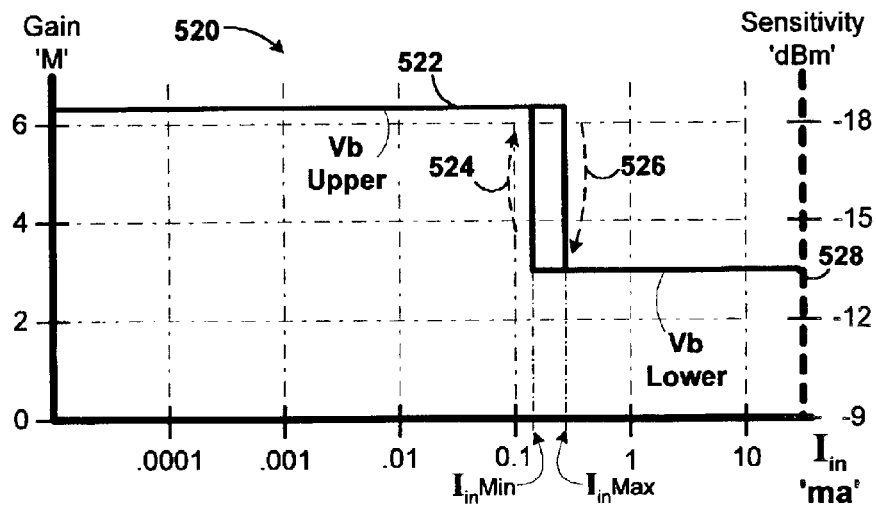
FIG. 5C is a graph showing the photo-detector gain and sensitivity in the optical receiver versus the received signal strength in milli-amperes.

FIG. 5C is a graph with a curve 520 showing the photo-detector gain and sensitivity in the optical receiver versus the received signal strength in milli-amperes. At monitored current levels from 0.000 ma to 0.2 ma the bias voltage 522 for the positive side biased APD is $V_i$Upper (e.g. 48 volts). At monitored current levels from 0.3 ma to 10 ma the bias voltage 528 for the positive side biased APD is $V_i$Lower (e.g. 46 volts). Between 0.2 ma–0.3 ma the bias voltage level will be determined on the basis of the bias voltage history. The digital history of bias voltage is used to impart hysteresis digitally to the transition between the upper and lower target bias voltage regions. Hysteresis is represented graphically with positive and negative going transition portions 524–526 respectively of the target bias voltage curve 520.

Figure 6:
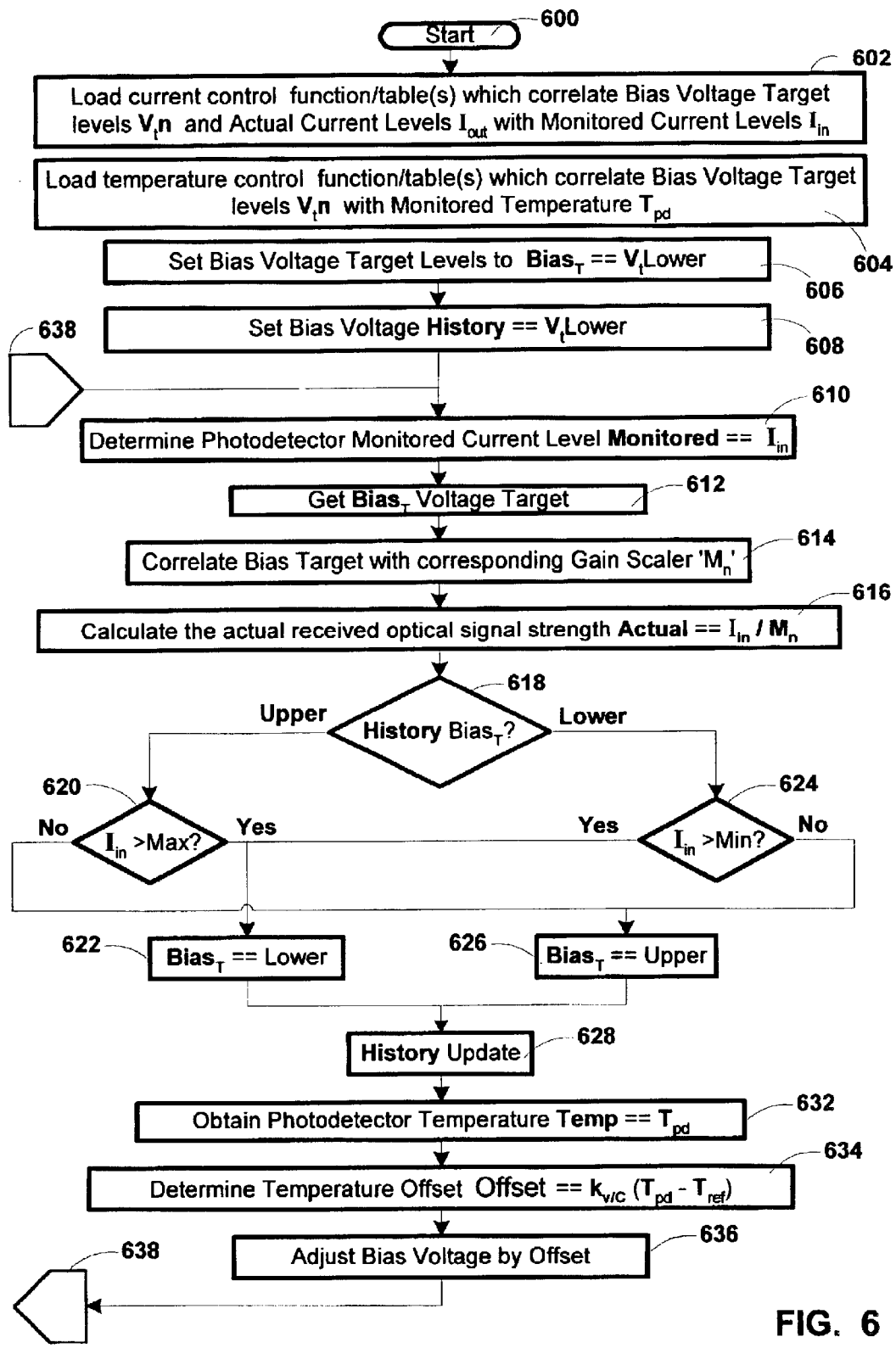
FIG. 6 is a process flow diagram showing the processes performed by the compensating circuit in response to varying operating temperatures and received signal strengths.

FIG. 6 is a process flow diagram showing the processes performed by the compensating circuit in response to varying operating temperatures and received signal strengths. After initialization 600, control passes to process 602 in which the tables and/or functions which correlate bias voltage target levels $V_i$n with monitored current levels $I_{in}$ and gain scalers are loaded into the current correlator (See FIGS. 2A–B Ref 260) These tables/functions include the maximum and minimum monitored current levels at which a transition between upper and lower target will take place. Next, in process 604 the tables and/or functions which correlate bias voltage offset with monitored temperature $T_{pd}$ are loaded into the temperature correlator (See FIGS. 2A–B Ref. 264). Then in processes 606–608 the bias voltage and the bias voltage history register are respectively set to the lower bias voltage target $V_i$Lower. Control then passes to process 610.

The next set of processes 610–616 determine the actual received optical signal level 234–236. In process 610–612 the monitored current level $I_{in}$ and the current bias voltage target level respectively are determined. Then in process 614 the bias voltage target is correlated with the values in the table/function 260 (See FIGS. 2A–B) to determine the current gain scaler. Next in process 616 the actual received optical signal strength is determined by dividing the sensed photo-detector current level as delivered to the current compensator 254 by the gain scaler in the associated table/function 260. The quotient is output on signal line 290. (See FIGS. 2A–B).

The next set of processes 618–628 handle compensation of the bias voltage target for differing received current levels. A determination is made as to whether a toggling of the bias voltage target is appropriate based on the bias voltage target history in the memory 262 and the monitored current level from the current sensor 276 (See FIGS. 2A–B). In decision process 618 a determination is made as to whether the prior bias voltage setting was at the upper or lower level. If the prior bias voltage setting was at the lower level control passes to decision process 624. If the prior bias voltage setting was at the upper level control passes to decision process 620.

For lower bias voltage levels a determination is made in decision process 624 as to whether the monitored current level exceeds the minimum value stored in process 602. If it does then the target bias voltage is maintained at the lower level in process 622 subsequent to which an update to the bias voltage history is performed in process 628. If alternately, in decision process 624 the monitored current is less than the minimum value then control passes to process 626 in which the bias voltage target is reset to the upper voltage level thereby increasing the sensitivity of the receiver. Subsequently the bias voltage history is updated in process 628.

For higher bias voltage levels a determination is made in decision process 620 as to whether the monitored current level exceeds the maximum value stored in process 602. If it does then the target bias voltage is reset at the lower level in process 622 thereby decreasing the sensitivity of the device. Subsequently the bias voltage history is updated in process 628. If alternately, in decision process 620 the monitored current is less than the maximum value then control passes to process 626 in which the bias voltage target is maintained at the upper voltage level and subsequently the bias voltage history is updated in process 628.

Processes 618–628 have the effect of toggling the output of the current compensator from the upper target bias voltage to the lower target bias voltage when the photo-detector current level exceeds the maximum photo-detector current level and from the lower target bias voltage to the upper target bias voltage when the photo-detector current level falls below the minimum current level, thereby exhibiting hysteresis between photo-detector current levels and target bias voltage levels.

The next set of processes 632–636, handle compensation of the bias voltage target for differing temperature levels. In process 632 the temperature of the photo-detector is determined. Then in process 634 the required bias voltage offset is determined for the monitored temperature using the parameters uploaded in process 604. The temperature related offset to the bias voltage, e.g. +/−# volts, is determined by multiplying a compensation coefficient k (volts/Centigrade) times the difference between the current temperature and the reference temperature at which the receiver was calibrated. The resultant value is in process 636 used to adjust the bias voltage target level determined in processes 618–628. Control then returns via splice block 638 to process 610 for the next round of current and temperature compensation.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for compensating a photo-detector; and the apparatus comprising:
   sensors configured to detect a temperature of the photo-detector and a current level of the photo-detector;
   a controller coupled to the sensors and configured to correlate the photo-detector temperature and the photo-detector current levels with a target bias voltage together with a temperature related offset to the target bias voltage so as to provide a corresponding power supply input signal; and
   a variable power supply configured so as to be responsive to the power supply input signal and thereby generate a bias voltage to the photo-detector.

2. The apparatus of claim 1, wherein the controller further comprises:
   a temperature compensator coupled to the sensors to correlate the photo-detector temperature from the sensors with a corresponding temperature related bias voltage offset which compensates the bias voltage for variations in the photo-detector temperature sensed by the sensors.

3. The apparatus of claim 1, wherein the controller further comprises:
   a current compensator coupled to the sensors to correlate the photo-detector current level from the sensors with the corresponding target bias voltage.

4. The apparatus of claim 1, wherein the controller further comprises:
   a temperature compensator coupled to the sensors to correlate the photo-detector temperature from the sensors with a corresponding temperature related bias voltage offset which compensates the bias voltage for variations in the photo-detector temperature sensed by the sensors;
   a current compensator coupled to the sensors to correlate the photo-detector current level from the sensors with the corresponding target bias voltage; and
   a summer with an output coupled to the variable power supply and with inputs coupled to the temperature and current compensators and with the summer summing the bias voltage offset with the target bias voltage and providing a sum which corresponds with the bias voltage at the output.

5. The apparatus of claim 1, wherein the controller further comprises:
   a memory for storing at least a prior target bias voltage;
   a table/function which correlates an upper target bias voltage with a maximum photo-detector current level and a lower target bias voltage with a minimum photo-detector current level; and
   a current compensator coupled to the memory and the table/function, and the current compensator storing a value corresponding with at least the prior target bias voltage in the memory and toggling a next target bias voltage between the upper and lower target bias voltage levels based on both the value stored in the memory together with the photo-detector current level sensed by the sensors, thereby effecting hysteresis in the toggling between target bias levels.

6. The apparatus of claim 1, wherein the controller further comprises:
   a memory for storing at least a prior target bias voltage;
   a table/function which correlates target bias voltages with associated gain scalers for scaling photo-detector current levels sensed by the sensors to correspond with the received optical signal strength at the photo-detector; and
   a current compensator coupled to the memory and the table/function, and the current compensator storing a value corresponding with the at least the prior target bias voltage in the memory and determining a actual current level for the photo-detector by correlating the value stored in memory with the corresponding gain scaler in the table/function and determining the received optical signal strength as a quotient of the photo-detector current level sensed by the sensor divided by the corresponding gain scaler.

7. An optical transceiver comprising:
   a transmitter for converting an electrical input to an optical output; and
   a receiver including:
      a photo-detector for converting an optical input to an analog electrical output;
      sensors coupled to the photo-detector to provide corresponding temperature and current levels thereof;
      a controller coupled to the sensors and configured to correlate the photo-detector temperature and current levels with a target bias voltage together with a temperature related offset to the target bias voltage; and a variable power supply configured so as to provide a bias voltage to the photo-detector, wherein the magnitude of the bias voltage is based on an input from the controller, the input being based upon the target bias voltage and the temperature related offset thereto.

8. The optical transceiver of claim 7, wherein the controller further comprises;
a temperature compensator coupled to the sensors to correlate the photo-detector temperature from the sensors with a corresponding temperature related bias voltage offset which compensates the bias voltage for variations in the photo-detector temperature sensed by the sensors.

9. The optical transceiver of claim 7, wherein the controller further comprises:
a current compensator coupled to the sensors to correlate the photo-detector current level from the sensors with the corresponding target bias voltage.

10. The optical transceiver of claim 7, wherein the controller further comprises:
a temperature compensator coupled to the sensors to correlate the photo-detector temperature from the sensors with a corresponding temperature related bias voltage offset which compensates the bias voltage for variations in the photo-detector temperature sensed by the sensors;
a current compensator coupled to the sensors to correlate the photo-detector current level from the sensors with the corresponding target bias voltage; and
a summer with an output coupled to the variable power supply and with inputs coupled to the temperature and current compensators and with the summer summing the bias voltage offset with the target bias voltage and providing a sum which corresponds with the bias voltage at the output.

11. The optical transceiver of claim 7, wherein the controller further comprises:
a memory for storing at least a prior target bias voltage;
a table/function which correlates an upper target bias voltage with a maximum photo-detector current level and a lower target bias voltage with a minimum photo-detector current level; and
a current compensator coupled to the memory and the table/function, and the current compensator storing a value corresponding with at least the prior target bias voltage in the memory and toggling a next target bias voltage between the upper and lower target bias voltage levels based on both the value stored in the memory together with the photo-detection current level sensed by the sensors, thereby effecting hysteresis in the toggling between target bias levels.

12. The optical transceiver of claim 7, wherein the controller further comprises:
a memory for storing at least a prior target bias voltage;
a table/function which correlates target bias voltages with associated gain scalers for scaling photo-detector current levels sensed by the sensors to correspond with the received optical signal strength at the photo-detector; and
a current compensator coupled to the memory and the table/function, and the current compensator storing a value corresponding with at least the prior target bias voltage in the memory and determining a actual current level for the photo-detector by correlating the value stored in memory with the corresponding gain scaler in the table/function and determining the received optical signal strength as a quotient of the photo-detector current level sensed by the sensor divided by the corresponding gain scaler.

13. The optical transceiver of claim 7, wherein the controller further comprises at least one of: an avalanche photo-diode (APD) photo-detector and a positive-intrinsic-negative (PIN) photo-detector.

14. A method for compensating a photo-detector comprising:
sensing the temperature and current levels of the photo-detector;
correlating photo-detector temperature and current levels sensed in the sensing act with a target bias voltage together with a temperature related offset to the target bias voltage; and
varying a bias voltage level to the photo-detector responsive to the correlating act.

15. The method of claim 14, wherein the correlating act further comprises:
correlating the photo-detector temperature sensed in the sensing act with a corresponding temperature related bias voltage offset which compensates the bias voltage for variations in the photo-detector temperature;
correlating the photo-detector current level sensed in the sensing act with the corresponding target bias voltage; and
summing the bias voltage offset with the target bias voltage and providing the corresponding sum to the varying act.

16. The method of claim 14, wherein the correlating act further comprises:
storing at least a prior target bias voltage;
correlating an upper target bias voltage with a maximum photo-detector current level and a lower target bias voltage with a minimum photo-detector current level; and
toggling a next target bias voltage between the upper and lower target bias voltage levels based on both the prior target bias voltage stored in the storing act together with the photo-detector current level sensed in the sensing act, thereby effecting hysteresis in the toggling between target bias levels.

17. The method of claim 14, wherein the correlating act further comprises;
storing at least a prior target bias voltage;
correlating target bias voltages with associated gain scalers for scaling photo-detector current levels sensed in the sensing act to correspond with the received optical signal strength at the photo-detector; and
determining the received optical signal strength as a quotient of the photo-detector current level sensed in the sensing act divided by the corresponding gain scaler from the second correlating act.

18. A means for compensating a photo-detector comprising:
means for sensing the temperature and current levels of the photo-detector;
means for correlating photo-detector temperature and current levels sensed by the means for sensing with a target bias voltage together with a temperature related offset to the target bias voltage; and
means for varying a bias voltage level to the photo-detector responsive to the target bias voltage and the temperature related offset.

19. The means of claim 18, wherein the means for correlating further comprises:
- means for correlating the photo-detector temperature sensed by the means for sensing with a corresponding temperature related bias voltage offset which compensates the bias voltage for variations in the photo-detector temperature;
- means for correlating the photo-detector current level sensed by the means for sensing with the corresponding target bias voltage; and
- means for summing the bias voltage offset with the target bias voltage and providing the corresponding sum to the means for varying.

20. The means of claim 18, wherein the means for correlating further comprises:
- means for storing at least a prior target bias voltage;
- means for correlating an upper target bias voltage with a maximum photo-detector current level and a lower target bias voltage with a minimum photo-detector current level; and
- means for toggling a next target bias voltage between the upper and lower target bias voltage levels based on both the prior target bias voltage stored by the means for storing together with the photo-detector current level sensed by the means for sensing, thereby effecting hysteresis in the toggling between target bias levels.

21. The means of claim 18, wherein the means for correlating further comprises:
- means for storing at least a prior target bias voltage;
- means for correlating target bias voltages with associated gain scalers for scaling photo-detector current levels sensed means for sensing to correspond with the received optical signal strength at the photo-detector; and
- means for determining the received optical signal strength as a quotient of the photo-detector current level sensed by the means for sensing divided by the corresponding gain scaler from the second correlating act.

22. An apparatus for compensating a photo-detector, the apparatus comprising:
- sensors configured to detect a temperature of the photo-detector and a current level of the photo-detector;
- a controller coupled to the sensors and configured to correlate the photo-detector temperature and the photo-detector current levels with a target bias voltage together with a temperature related offset to the target bias voltage so as to provide a corresponding power supply input signal, the controller comprising:
  - a temperature compensator coupled to the sensors to correlate the photo-detector temperature from the sensors with a corresponding temperature related bias voltage offset which compensates the bias voltage for variations in the photo-detector temperature sensed by the sensors;
  - a current compensator coupled to the sensors to correlate the photo-detector current level from the sensors with the corresponding target bias voltage; and
  - a summer with an output coupled to the variable power supply and with inputs coupled to the temperature and current compensators and with the summer summing the bias voltage offset with the target bias voltage and providing a sum which corresponds with the bias voltage at the output; and
- a variable power supply configured so as to be responsive to the power supply input signal and thereby generate a bias voltage to the photo-detector.

23. An apparatus for compensating a photo-detector, the apparatus comprising:
- sensors configured to detect a temperature of the photo-detector and a current level of the photo-detector;
- a controller coupled to the sensors and configured to correlate the photo-detector temperature and the photo-detector current levels with a target bias voltage together with a temperature related offset to the target bias voltage so as to provide a corresponding power supply input signal, the controller comprising:
  - a memory for storing at least a prior target bias voltage;
  - a table/function which correlates an upper target bias voltage with a maximum photo-detector current level and a lower target bias voltage with a minimum photo-detector current level; and
  - a current compensator coupled to the memory and the table/function, and the current compensator storing a value corresponding with at least the prior target bias voltage in the memory and toggling a next target bias voltage between the upper and lower target bias voltage levels based on both the value stored in the memory together with the photo-detector current level sensed by the sensors, thereby effecting hysteresis in the toggling between target bias levels; and
- a variable power supply configured so as to be responsive to the power supply input signal and thereby generate a bias voltage to the photo-detector.

24. An apparatus for compensating a photo-detector, the apparatus comprising:
- sensors configured to detect a temperature of the photo-detector and a current level of the photo-detector;
- a controller coupled to the sensors and configured to correlate the photo-detector temperature and the photo-detector current levels with a target bias voltage together with a temperature related offset to the target bias voltage so as to provide a corresponding power supply input signal, the controller comprising:
  - a memory for storing at least a prior target bias voltage;
  - a table/function which correlates target bias voltages with associated gain scalers for scaling photo-detector current levels sensed by the sensors to correspond with the received optical signal strength at the photo-detector; and
  - a current compensator coupled to the memory and the table/function, and the current compensator storing a value corresponding with the at least the prior target bias voltage in the memory and determining a actual current level for the photodetector by correlating the value stored in memory with the corresponding gain scaler in the table/function and determining the received optical signal strength as a quotient of the photo-detector current level sensed by the sensor divided by the corresponding gain scaler; and
- a variable power supply configured so as to be responsive to the power supply input signal and thereby generate a bias voltage to the photo-detector.

25. A method for compensating a photo-detector comprising:
- sensing the temperature and current levels of the photo-detector;
- correlating photo-detector temperature and current levels sensed in the sensing act with a target bias voltage together with a temperature related offset to the target bias voltage, the correlating act further comprising:
  - correlating the photo-detector temperature sensed in the sensing act with a corresponding temperature related bias voltage offset which compensates the bias voltage for variations in the photo-detector temperature;

correlating the photo-detector current level sensed in the sensing act with the corresponding target bias voltage; and summing the bias voltage offset with the target bias voltage and providing the corresponding sum to the varying act; and varying a bias voltage level to the photo-detector responsive to the correlating act.

26. A method for compensating a photo-detector comprising:

sensing the temperature and current levels of the photo-detector;

correlating photo-detector temperature and current levels sensed in the sensing act with a target bias voltage together with a temperature related offset to the target bias voltage, the correlating act further comprising:

storing at least a prior target bias voltage;

correlating an upper target bias voltage with a maximum photo-detector current level and a lower target bias voltage with a minimum photo-detector current level; and toggling a next target bias voltage between the upper and lower target bias voltage levels based on both the prior target bias voltage stored in the storing act together with the photo-detector current level sensed in the sensing act, thereby effecting hysteresis in the toggling between target bias levels; and varying a bias voltage level to the photo-detector responsive to the correlating act.

27. A method for compensating a photo-detector comprising:

sensing the temperature and current levels of the photo-detector;

correlating photo-detector temperature and current levels sensed in the sensing act with a target bias voltage together with a temperature related offset to the target bias voltage, the correlating act further comprising:

storing at least a prior target bias voltage;

correlating target bias voltages with associated gain scalers for scaling photo-detector current levels sensed in the sensing act to correspond with the received optical signal strength at the photo-detector; and determining the received optical signal strength as a quotient of the photo-detector current level sensed in the sensing act divided by the corresponding gain scaler from the second correlating act; and varying a bias voltage level to the photo-detector responsive to the correlating act.

* * * * *